United States Patent [19]

Tanaka et al.

[11] Patent Number: 5,128,408
[45] Date of Patent: Jul. 7, 1992

[54] GAS-PERMEABLE MATERIAL WITH EXCELLENT COMPATIBILITY WITH BLOOD

[75] Inventors: Masakazu Tanaka; Satoru Murata; Susumu Kashiwabara; Ken Murayama, all of Ohtsu, Japan

[73] Assignee: Toyo Boseki Kabushiki Kaisha, Osaka, Japan

[21] Appl. No.: 607,748

[22] Filed: Oct. 31, 1990

Related U.S. Application Data

[63] Continuation of Ser. No. 271,823, Nov. 16, 1988, abandoned.

[30] Foreign Application Priority Data

Nov. 16, 1987 [JP] Japan .................. 62-290419
Oct. 24, 1988 [JP] Japan .................. 63-267764

[51] Int. Cl.$^5$ .................. C08G 18/61; C08G 18/83
[52] U.S. Cl. .................. 525/54.2; 525/424; 525/431; 525/440; 525/446; 525/452; 525/453; 525/459; 528/28; 528/29
[58] Field of Search ............ 525/452, 453, 459, 54.22, 525/54.2, 431, 424, 440, 446; 528/28, 29, 30

[56] References Cited

U.S. PATENT DOCUMENTS

| | | | |
|---|---|---|---|
| 3,395,129 | 7/1968 | Dieterich et al. | 525/409 |
| 3,562,352 | 2/1971 | Nyilas | 525/453 |
| 3,755,218 | 8/1973 | Yen et al. | 525/54.2 |
| 4,528,343 | 7/1985 | Kira | 528/28 |
| 4,647,643 | 3/1987 | Zdrahala et al. | 528/28 |
| 4,675,361 | 6/1987 | Ward | 525/92 |
| 4,793,555 | 12/1988 | Lee et al. | 528/28 |
| 4,939,007 | 7/1990 | Hu et al. | 528/28 |

FOREIGN PATENT DOCUMENTS 0094050 11/1983 European Pat. Off. .
54-147696 11/1979 Japan .
61-000430 1/1986 Japan .
62-102815 5/1987 Japan .

OTHER PUBLICATIONS

Xue-Hai, et al., "Polydimethylsiloxane-Polyurethane Elastomers: Synthesis and Properties of Segmented Copolymers and Related Zwitterionomers", *Journal of Polymer Science,* Polymer Physics Ed., 23, 2319-2338 (1985).

"Segmented Organopolysiloxane Copolymer: 1 Synthesis of Siloxane-Urea Copolymers", Yilgor et al., *Polymer,* Dec. 1984, vol. 25, pp. 1800-1806.

"Segmented Organopolysiloxane Copolymer: 2 Thermal and Mechanical Properties of Siloxane-Urea Copolymers", Yilgor et al., *Polymer,* Dec. 1984, vol. 25, pp. 1807-1816.

*Primary Examiner*—John C. Bleutge
*Assistant Examiner*—R. Dean, Jr.
*Attorney, Agent, or Firm*—Wegner, Cantor, Mueller & Player

[57] ABSTRACT

A gas-permeable material with excellent compatibility with blood comprising polyurethane, polyurethaneurea, or the derivatives thereof is provided. The polyurethane or polyurethaneurea is obtained from a composition that comprises diisocyanate; polysiloxane containing terminal hydroxyl groups; and polyol or polyamine containing at least one tertiary amino gorup. The derivatives of the polyurethane or polyurethaneurea is obtained by the following steps of: converting the tertiary amino groups contained in the polyurethane or the polyurethaneurea to quarternary ammonium groups, and treating the polyurethane or the polyurethaneurea having quarternary ammonium groups with heparin.

8 Claims, No Drawings

GAS-PERMEABLE MATERIAL WITH EXCELLENT COMPATIBILITY WITH BLOOD

This application is a continuation of U.S. application Ser. No. 07/271,823, filed Nov. 16, 1988, now abandoned.

BACKGROUND OF THE INVENTION

1. Field of the Invention:

This invention relates to a material for oxygen-exchange membranes for gas-exchange devices such as artificial heart-lung machines that maintain the circulation of the blood and the oxygen supply during open heart surgery, oxygenators (artificial lung machines) that aid lung function for patients with lung insufficiency, extracorporeal membrane oxygenators (ECMO) used for extracorporeal circulation that is to be maintained for a long period of time, etc.

2. Description of the Prior Art

At present, there are the following three major categories of gas exchange devices (where venous blood is changed into arterial blood by the addition of oxygen and the removal of carbon dioxide from the blood) for commercially available artificial heart-lung machines that are used in open-heart surgery: (1) the kind with direct contact between gases and the blood (bubble type, film type, etc.), (2) the kind with small pores (the type in which gas exchange occurs via pores with the diameter of several hundreds to several thousands of angstroms (the hollow fiber type, the layered type, etc.); and (3) the gas diffusion type (the type in which gas exchange is accomplished by the dissolution and the diffusion of the gas into a homogeneous membrane).

Of these, in category 1, venous blood is bubbled directly with oxygen to change the blood into arterial blood. By this method, because the blood is brought into direct contact with oxygen, erythrocytes are lysed, and the amount of free hemoglobin increases. That is, with this method, hemolysis occurs readily. Also, because oxygen gas is directly bubbled through, the gas remains in the blood in the form of fine bubbles. It is difficult to remove the bubbles, and they greatly damage the blood. For that reason, it is difficult to use this form of substitution for heart and lung function over long periods of time.

In category 2, in which gas exchange is through small pores, because there is no direct contact between the blood and the gas as in category 1, the two problems of damage to the blood corpuscles and the mixture of gas bubbles with the blood are solved. However, because the water components of the blood and also components of the plasma ooze through the pores, the gas-exchange function decreases with time. Also, the material of this kind of membrane is generally polypropylene or the like, and the compatibility of such substances with the blood is inferior. That is, if such substances are used, blood coagulation factors and complements are activated, and in addition, platelets and leukocytes readily agglutinate or are readily lysed. To control these reactions, large amounts of anticoagulant agents such as heparin are needed. When large amounts of heparin are administered, hemorrhage readily occurs, and presents a risk to survival. In this way, if a gas-exchange device of the second category is used for a long period of time, multiple organ insufficiency will occur because of hemorrhage and damage to blood components, making such use impossible.

Because the gas exchange by means of devices in the third category occurs via a homogeneous membrane, the problems of damage to blood corpuscles and the mixture of gas bubbles with the blood caused in devices of the first category are avoided, and the disadvantages of oozing of water and plasma components that occur with devices of category 2 are also overcome. This kind of membrane is generally manufactured from silicone rubber (silicone-type polymers). The compatibility of silicone rubber with the blood is better than that of other materials. Thus, of these gas-exchange devices in categories 1 to 3, the devices of category 3 seem to be most satisfactory. However, this kind of membrane has the following drawbacks. (a) Because silicone rubber by itself is not strong, either the membrane must be made thick so that strength can be provided, or else the rubber must be reinforced with a reinforcing material such as fillers. For this reason, the diffusion of gas is slowed, and the capability of oxygen exchange is decreased. (b) The compatibility of silicone rubber with the blood is not completely satisfactory, and because this material causes blood coagulation, large amounts of heparin must be given at the time of the use of the device, and for that reason, hemorrhaging readily occurs, presenting a danger to survival. (c) Activation of complement causes changes in the blood coagulation system, giving rise to increased permeability of the vessel walls to leukocytes, lymphocytes, etc., increased numbers of leukocytes, and so on. Therefore, treatment with use of a silicone membrane causes the development of fever or symptoms of shock, thus presenting a danger to survival or delaying convalescence after surgery. The longest period of time for which gas-exchange devices of this type can be used is two or three days; survival rates when such devices are used for longer periods are close to zero.

Research has been done into the following kinds of polymers, among others, as materials that might be used in place of the silicone rubber membrane in devices of category 3. As examples of an improved material in terms of strength (problem "a" mentioned above), a silicone-polycarbonate copolymer is disclosed in U.S. Pat. Nos. 3,419,634 and 3,419,635. Also, a method for the manufacture of thin membranes in which that copolymer is used is disclosed in U.S. Pat. No. 3,767,737. Japanese Laid-Open Patent Publication 61-430 discloses a selectively gas-permeable membrane made of a polyurethaneurea obtained by the reaction of diaminopolysiloxane, isocyanate, and compounds having a plurality of amino groups. In addition, in Japanese Patent Application 60-241567 (No. PM-80 for research into basic techniques for polymers), a selectively gas-permeable membrane made of a polyurethaneurea that is obtained by the reaction of diaminopolysiloxane, isocyanate, and polyhydric compounds having tertiary amino groups is disclosed. These polymers are relatively strong, but their compatibility with the blood cannot yet be said to be completely satisfactory, so that the problems described in sections b and c above have not been solved. Also, because the polymers disclosed in Japanese Patent Publication 61-430 and Japanese Patent Application 60-241567 have within their molecules a siloxane bond and a urea bond that have opposite polarities, the choice of a solvent for use during the preparation of the membrane is difficult, and it is difficult to make a thin membrane.

As materials that can solve the problem of blood coagulation described above in section b, a kind of polymer to which heparin is attached by ionic bond has been disclosed in *Collected Papers on Polymers*, 36, 223 (1979). The polymer is obtained by the following steps: tertiary amino groups of a terpolymer that contains dimethylaminoethylmethacrylate, methoxypolyethyleneglycol methacrylate, and glycidyl methacrylate are changed to tertiary ammonium groups, the resulting polymer is blended with polyurethane, and the mixture is heated so that a cross-linking reaction proceeds. The product that is obtained from this material releases heparin slowly from its surface, which prevents blood coagulation. However, gas permeation of this material is not satisfactory, and it cannot be used in an artificial heart-lung machine. An anti-blood-clotting elastomer made of polyurethane or polyurethaneurea that contains polysiloxane has been disclosed in Japanese Patent Publication 58-188458. However, the anti-blood-clotting properties of this elastomer are not satisfactory. Also, its permeability to gases is not satisfactory, and because the activation of complement is not controlled, the elastomer cannot be used for the applications described above.

Many materials exist in the field of dialysis membranes for use in artificial kidneys for dialysis that might be used to solve the problem of complement activation in the blood discussed above in section c. For example, in *Jinko Zoki* 16 (2), 818–821 (1987), it is reported that when a cellulose membrane modified with diethylaminoethyl groups is used, activation of complement during dialysis is markedly decreased compared to with the original cellulose membrane. However, because the permeability of this membrane to gases is poor, it is difficult to use the material as membranes for oxygenators (artificial lung machines).

SUMMARY OF THE INVENTION

The gas-permeable material with excellent compatibility with blood of this invention, which overcomes the above-discussed and numerous other disadvantages and deficiencies of the prior art, comprises polyurethane or polyurethaneurea, wherein the polyurethane or polyurethaneurea is obtained from a composition that comprises diisocyanate; polysiloxane containing terminal hydroxyl groups; polyol or polyamine containing at least one tertiary amino group; and if required, polyol or polyamine other than the polyol or polyamine containing the tertiary amino group.

The gas-permeable material with excellent compatibility with blood of this invention comprises polyurethaneurea wherein the polyurethaneurea is obtained from a composition that comprises diisocyanate; polysiloxane containing terminal amino groups; polyamine containing at least one tertiary amino group; and if required, polyol or polyamine other than the polyamine containing the tertiary amino group.

The gas-permeable material with excellent compatibility with blood of this invention is obtained by the following steps of:

preparing polyurethane or polyurethaneurea from a composition that comprises diisocyanate; polysiloxane containing terminal hydroxyl groups or terminal amino groups; polyol or polyamine containing at least one tertiary amino group; and if required, polyol or polyamine other than the polyol or polyamine containing the tertiary amino groups;

converting the tertiary amino groups contained in the polyurethane or the polyurethaneurea to quarternary ammonium groups; and treating the polyurethane or the polyurethaneurea having quarternary ammonium groups with heparin.

The gas-permeable material with excellent compatibility with blood of this invention comprises polyurethane or polyurethaneurea obtained from a composition comprising diisocyanate; polysiloxane containing terminal hydroxyl groups or amino groups; a polyesterpolyol, polyetherpolyol or a polyamidepolyamine containing at least one tertiary amino group; and if required polyol or polyamine other than the polyol or polyamine containing the tertiary amino groups.

The gas-permeable material with excellent compatibility with blood of this invention is obtained by the following steps of:

converting the tertiary amino groups contained in the polyurethane or the polyurethaneurea obtained by using the polyesterpolyol or the polyamidepolyamine to quarternary ammonium groups, and treating the polyurethane or the polyurethaneurea having quarternary ammonium groups with heparin.

Accordingly, the invention described herein makes possible the objectives of (1) providing a gas-permeable material with excellent permeability to gas, and moreover, excellent compatibility to blood; (2) providing a gas-permeable material with the excellent properties described above and that can be readily formed into thin membranes or hollow fibers; and (3) providing a gas-permeable material that can be used in a wide variety of applications as a material for membranes for oxygen exchange in artificial heart-lung machines, artificial lungs, ECMO, and the like; as an oxygen-enrichment membranes for gas-combustion; and as a coating material for devices for medical treatment.

DESCRIPTION OF THE PREFERRED EMBODIMENTS

As the diisocyanates that can be used in the polyurethane or polyurethaneurea for the gas-permeable material of this invention, any of the diisocyanates (aromatic, aliphatic, alicyclic) that are ordinarily used in the preparation of polyurethane or polyurethaneurea can be used. As aromatic diisocyanates, there are aromatic diisocyanates that contain carbon atoms from 8 to 25 such as 2,4-tolylene diisocyanate, 2,6-tolylene diisocyanate, xylylene diisocyanate, 4,4'-diphenylmethane diisocyanate, 4,4'-diphenylpropane diisocyanate, phenylene diisocyanate, naphthalene diisocyanate, etc. The aliphatic diisocyanate contains 6 to 20 carbon atoms, the examples of which include hexamethylene diisocyanate, heptamethylene diisocyanate, octamethylene diisocyanate, nonamethylene diisocyanate, decamethylene diisocyanate, etc. The alicyclic diisocyanate contains 8 to 20 carbon atoms, the examples of which include 4,4'-dicyclohexylmethane diisocyanate, isophorone diisocyanate etc. All of the above diisocyanates can be used in mixtures of two or more varieties. Below, the ingredients that can be used for polymers of this invention, such as polysiloxane, polyol with at least one tertiary amino group, polyamine, and the like, can all be used in mixtures of two or more varieties.

The polysiloxane that has terminal hydroxyl groups or amino groups reactable with isocyanate groups is preferably of the structure shown by general formula I:

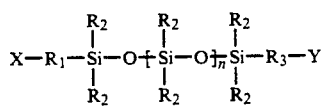

(I)

wherein X and Y are independently —OH, —NH₂, or mono-substituted amino containing 1 to 5 carbon atoms; R₁ and R₃ are independently alkylene, oxyalkylene, aralkylene or arylene containing 2 to 10 carbon atoms; R₂s are independently alkyl, aryl or aralkyl containing 1 to 10 carbon atoms; and n is an integer from 5 to 300.

The molecular weight of this polysiloxane is 200–20,000, and preferably, 500 to 8000. The proportion by weight of this polysiloxane in the polyurethane or polyurethaneurea is 20–95%, and preferably 30–85%.

As the polyol or polyamine that has at least one tertiary amino group that is used in this invention, polyols that have the structures shown in the following general formulae II–IV; polyols that have been added with ethylene oxide or propylene oxide to the polyols that have the structures shown in general formulae II–IV; and polyamines that have the structures shown in general formulae V–VI can be used;

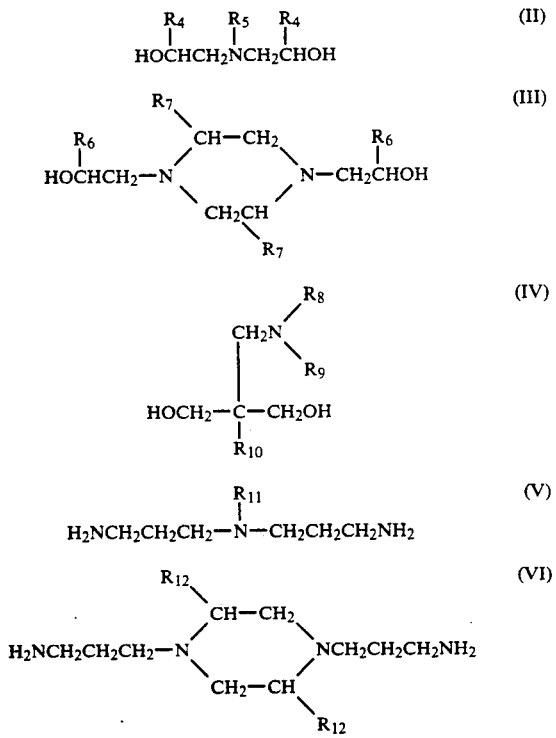

(Where, R₄, R₆, R₇, and R₁₂ are, independently, hydrogen atoms or alkyl groups containing 1–5 carbon atoms; R₅, R₁₀, and R₁₁ are alkyl groups, cycloalkyl groups, aryl groups, aralkyl groups, or

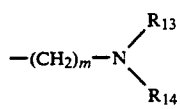

(where m is an integer from 1–5) containing 1–20 carbon atoms; R₈, R₉, R₁₃, and R₁₄ are, independently, alkyl groups, aryl groups, or aralkyl groups containing 1–10 carbon atoms; and R₈ and R₉, and R₁₃ and R₁₄ can be the same alkylene groups and form a heterocyclic ring with a nitrogen atom).

The following compounds can be listed as polyols that have at least one tertiary amino group shown by the formula II (below, called aminediols): 3-methyl-3-aza-1,5-pentanediol, 3-ethyl-3-aza-1,5-pentanediol, 3-n-propyl-3-aza-1,5-pentanediol, 3-isopropyl-3-aza-1,5-pentanediol, 3-n-butyl-3-aza-1,5-pentanediol, 3-sec-butyl-3-aza-1,5-pentanediol, 3-tertbutyl-3-aza-1,5-pentanediol, 3-pentyl-3-aza-1,5-pentanediol, 3-hexyl-3-aza-1,5-pentanediol, 3-cyclohexyl-3-aza-1,5-pentanediol, 3-phenyl-3-aza-1,5-pentanediol, 3-benzyl-3-aza-1,5-pentanediol, 3-heptyl-3-aza-1,5-pentanediol, 3-octyl-3-aza-1,5-pentanediol, 3-nonyl-3-aza-1,5-pentanediol, 3-decyl-3-aza-1,5-pentanediol, 4-methyl-4-aza-2,6-heptanediol, 4-ethyl-4-aza-2,6-heptanediol, 4-n-propyl-4-aza-2,6-heptanediol, 4-iso-propyl-4-aza-2,6-heptanediol, 4-n-butyl-4-aza-2,6-heptanediol, 4-iso-butyl-4-aza-2,6-heptanediol, 4-sec-butyl-4-aza-2,6-heptanediol, 4-tert-butyl-4-aza-2,6-heptanediol, 4-pentyl-4-aza-2,6-heptanediol, 4-hexyl-4-aza-2,6-heptanediol, 4-cyclohexyl-4-aza-2,6-heptanediol, 4-phenyl-4-aza-2,6-heptanediol, 4-benzyl-4-aza-2,6-heptanediol, 4-heptyl-4-aza-2,6-heptanediol, 4-octyl-4-aza-2,6-heptanediol, 4-nonyl-4-aza-2,6-heptanediol, 4-decyl-4-aza-2,6-heptanediol, 3-N,N-dimethylaminoethyl-3-aza-1,5-pentanediol, 3-N,N-diethylaminoethyl-3-aza-1,5-pentanediol, 3-N,N-di-n-propylaminoethyl-3-aza-1,5-pentanediol, 3-N,N-di-iso-propylaminoethyl-3-aza-1,5-pentanediol, 3-N,N-di-n-butylaminoethyl-3-aza-1,5-pentanediol, 3-N,N-di-sec-butylaminoethyl-3-aza-1,5-pentanediol, 3-N,N-dipentylaminoethyl-3-aza-1,5-pentanediol, 3-N,N-dihexylaminoethyl-3-aza-1,5-pentanediol, 3-dicyclohexylaminoethyl-3-aza-1,5-pentanediol, 3-dibenzylaminoethyl-3-aza-1,5-pentanediol, 3-N,N-dimethylaminopropyl-3-aza-1,5-pentanediol, 3-N,N-diethylaminopropyl-3-aza-1,5-pentanediol, 3-N,N-di-n-propylaminopropyl-3-aza-1,5-pentanediol, 3-N,N-di-iso-propylaminopropyl-3-aza-1,5-pentanediol, 3-N,N-di-n-butylaminopropyl-3-aza-1,5-pentanediol, 3-N,N-di-iso-butylaminopropyl-3-aza-1,5-pentanediol, 3-N,N-di-sec-butylaminopropyl-3-aza-1,5-pentanediol, 3-N,N-dipentylaminopropyl-3-aza-1,5-pentanediol, 3-N,N-dihexylaminopropyl-3-aza-1,5-pentanediol, 3-N,N-dicylohexylaminopropyl-3-aza-1,5-pentanediol, 3-N,N-dibenzylaminopropyl-3-aza-1,5-pentanediol, 4-N,N-dimethylaminoethyl-4-aza-2,6-heptanediol, 4-N,N-diethylaminoethyl-4-aza-2,6-heptanediol, 4-N,N-di-n-propylaminoethyl-4-aza-2,6-heptanediol, 4-N,N-di-iso-propylaminoethyl-4-aza-2,6-heptanediol, 4-N,N-di-n-propylaminoethyl-4-aza-2,6-heptanediol, 4-N,N-di-iso-propylaminoethyl-4-aza-2,6-heptanediol, 4-N,N-di-n-butylaminoethyl-4-aza-2,6-heptanediol, 4-N,N-di-iso-butylaminoethyl-4-aza-2,6-heptanediol, 4-N,N-di-sec-butylaminoethyl-4-aza-2,6-heptanediol, 4-N,N-diheptylaminoethyl-4-aza-2,6-heptanediol, 4-N,N-dihexylaminoethyl-4-aza-2,6-heptanediol, 4-N,N-dicyclohexylaminoethyl-4-aza-2,6-heptanediol, 4-N,N-dibenzylaminoethyl-4-aza-2,6-heptanediol, 4-N,N-dimethylaminopropyl-4-aza-2,6-heptanediol, 4-N,N-diethylaminopropyl-4-aza-2,6-heptanediol, 4-N,N-di-n-propylaminopropyl-4-aza-2,6-heptanediol, 4-N,N-di-iso-propylaminopropyl-4-aza-2,6-heptanediol, 4-N,N-di-n-butylaminopropyl-4-aza-2,6-heptanediol, 4-N,N-di-iso-butylaminopropyl-4-aza-2,6-heptanediol, 4-N,N-di-sec-butylaminopropyl-4-aza-2,6-heptanediol, 4-N,N-dipentylaminopropyl-4-aza-2,6-heptanediol, 4-N,N-dihexylaminopropyl-4-aza-2,6-heptanediol, 4-N,N-diheptylaminopropyl-4-aza-2,6-heptanediol, 4-N,N-dicyclohexylaminopropyl-4-aza-2,6-heptanediol, 4-N,N-dioctylaminopropyl-4-aza-2,6-heptanediol, 4-N,N-dinonylaminopropyl-4-aza-2,6-heptanediol, 4-N,N-didecylaminopropyl-4-aza-2,6-heptanediol, 4-N,N-dibenzylaminopropyl-4-aza-2,6-heptanediol.

The aminediol shown by the above-mentioned formula III includes: N,N'-di($\beta$-hydroxypropyl)piperazine, N,N'-di($\beta$-hydroxyethyl)piperazine, N,N'-di($\beta$-hydroxypropyl)-2,5-dimethylpiperazine, N,N'-di-($\beta$-hydroxyethyl)-2,6-dimethylpiperazine, N,N'-di($\beta$-hydroxypropyl)-2,6-diethylpiperazine, N,N'-di($\beta$-hydroxyethyl)-2,6-diethylpiperazine.

The aminediol shown by the above-mentioned formula IV includes: 2-N,N-dimethylaminomethyl-2-methyl-1,3-propanediol, 2-N,N-diethylaminomethyl-2-methyl-1,3-propanediol, 2-N,N-di-n-propylaminomethyl-2-methyl-1,3-propanediol, 2-N,N-di-iso-propylaminomethyl-2-methyl-1,3-propanediol, 2-N,N-di-n-butylaminomethyl-2-methyl-1,3-propanediol, 2-N,N-di-iso-butylaminomethyl-2-methyl-1,3-propanediol, 2-N,N-di-sec-butylaminomethyl-2-methyl-1,3-propanediol, 2-N,N-dipentylaminomethyl-2-methyl-1,3-propanediol, 2-N,N-dihexylaminomethyl-2-methyl-1,3-propanediol, 2-N,N-dicyclohexylaminomethyl-2-methyl-1,3-propanediol, 2-N,N-dibenzylaminomethyl-2-methyl-1,3-propanediol, 2-N,N-dimethylaminomethyl-2-ethyl-1,3-propanediol, 2-N,N-diethylaminomethyl-2-ethyl-1,3-propanediol, 2-N,N-di-n-propylaminomethyl-2-ethyl-1,3-propanediol, 2-N,N-di-iso-propylaminomethyl-2-ethyl-1,3-propanediol, 2-N,N-di-n-butylaminomethyl-2-ethyl-1,3-propanediol, 2-N,N-di-iso-butylaminomethyl-2-ethyl-1,3-propanediol, 2-N,N-di-sec-butylaminomethyl-2-ethyl-1,3-propanediol, 2-N,N-dipentylaminomethyl-2-ethyl-1,3-propanediol, 2-N,N-dihexylaminomethyl-2-ethyl-1,3-propanediol, 2-N,N-dicyclohexylaminomethyl-2-ethyl-1,3-propanediol, 2-N,N-dibenzylaminomethyl-2-ethyl-1,3-propanediol, etc.

In this invention, as described above, polyols of the type in which ethylene oxide or propylene oxide is added to an aminediol of the general formulae II-IV can be used (called the "epoxy-adduct" type). The number of additions of ethylene oxide or propylene oxide per molecule of aminediol is from 1-20.

Polyamines of the general formula V (called aminodiamines below) include the following compounds: 4-methyl-4-aza-1,7-diaminoheptane, 4-ethyl-4-aza-1,7-diaminoheptane, 4-n-propyl-4-aza-1,7-diaminoheptane, 4-iso-propyl-4-aza-1,7-diaminoheptane, 4-n-butyl-4-aza-1,7-diaminoheptane, 4-iso-butyl-4-aza-1,7-diaminoheptane, 4-sec-butyl-4-aza-1,7-diaminoheptane, 4-tertbutyl-4-aza-1,7-diaminoheptane, 4-pentyl-4-aza-1,7-diaminoheptane, 4-n-hexyl-4-aza-1,7-diaminoheptane, 4-cyclohexyl-4-aza-1,7-diaminoheptane, 4-heptyl-4-aza-1,7-diaminoheptane, 4-octyl-4-aza-1,7-diaminoheptane, 4-nonyl-4-aza-1,7-diaminoheptane, 4-decyl-4-aza-1,7-diaminoheptane, 4-phenyl-4-aza-1,7-diaminoheptane, 4-benzyl-4-aza-1,7-diaminoheptane, 4-dimethylaminoethyl-4-aza-1,7-diaminoheptane, 4-diethylaminoethyl-4-aza-1,7-diaminoheptane, 4-di-n-propylaminoethyl-4-aza-1,7-diaminoheptane, 4-N,N-di-iso-propylaminoethyl-4-aza-1,7-diaminoheptane, 4-N,N-di-n-butylaminoethyl-4-aza-1,7-diaminoheptane, 4-N,N-di-iso-butylaminoethyl-4-aza-1,7-diaminoheptane, 4-N,N-di-sec-butylaminoethyl-4-aza-1,7-diaminoheptane, 4-N,N-dipentylaminoethyl-4-aza-1,7-diaminoheptane, 4-N,N-dihexylaminoethyl-4-aza-1,7-diaminoheptane, 4-N,N-dicyclohexylaminoethyl-4-aza-1,7-diaminoheptane, 4-N,N-diheptylaminoethyl-4-aza-1,7-diaminoheptane, 4-N,N-dioctylaminoethyl-4-aza-1,7-diaminoheptane, 4-N,N-dinonylaminoethyl-4-aza-1,7-diaminoheptane, 4-N,N-didecylaminoethyl-4-aza-1,7-diaminoheptane, 4-N,N-dimethylaminopropyl-4-aza-1,7-diaminoheptane, 4-N,N-diethylaminopropyl-4-aza-1,7-diaminoheptane, 4-N,N-di-n-propylaminopropyl-4-aza-1,7-diaminoheptane, 4-N,N-di-iso-propyl-4-aza-1,7-diaminoheptane, 4-N,N-di-n-butylaminopropyl-4-aza-1,7-diaminoheptane, 4-di-N,N-iso-butylaminopropyl-4-aza-1,7-diaminoheptane, 4-N,N-di-sec-butylaminopropyl-4-aza-1,7-diaminoheptane, 4-N,N-dipentylaminopropyl-4-aza-1,7-diaminoheptane, 4-N,N-dihexylaminopropyl-4-aza-1,7-diaminoheptane, 4-N,N-dicyclohexylaminopropyl-4-aza-1,7-diaminoheptane, 4-N,N-diheptylaminopropyl-4-aza-1,7-diaminoheptane, 4-N,N-dioctylaminopropyl-4-aza-1,7-diaminoheptane, 4-N,N-dinonylaminopropyl-4-aza-1,7-diaminoheptane, 4-N,N-didecylaminopropyl-4-aza-1,7-diaminoheptane, 4-N,N-dibenzylaminopropyl-4-aza-1,7-diaminoheptane, etc.

The aminodiamine shown by the above-mentioned formula VI includes: N,N'-di($\gamma$-aminopropyl)piperazine, N,N'-di($\gamma$-aminopropyl)-2,6-dimethylpiperazine, N,N'-di($\gamma$-aminopropyl)-2,6-diethylpiperazine, etc.

Of these aminediols shown by the general formulae II-IV that have at least one tertiary amino group (including those that are epoxy adducts; below, the word "aminediols" includes their epoxy adducts) and aminodiamines of the general formulae V and VI, an aminediol or aminodiamine shown by the formula II or V in which $R_5$ or $R_{11}$ is dialkylaminopropyl group is preferred. Both the aminediol of formulae II-IV and the aminodiamine of formulae V-VI are used so that tertiary amino groups are contained in the resulting polymer in the proportion of 0.01-3.00 mmol/g, and preferably 0.05-2.00 mmol/g.

Instead of the polyol or polyamine that has at least one tertiary amino group that was mentioned above, or in addition to it, it is possible to use a polyol or a polyamine of high molecular weight that has at least one tertiary amino group. That is, in this invention, it is possible to use polyester polyol with at least one tertiary amino group (below, called aminopolyester polyol), a polyether polyol with at least one tertiary amino group (below, called aminopolyether polyol), and a polyamide polyamine with at least one tertiary amino group (below, called aminopolyamide polyamine).

Aminopolyester polyol, aminopolyether polyol, or aminopolyamide polyamine can be obtained from the reaction of a dibasic acid or its ester with a polyol that has one of the structures shown in formulae II-IV (including ethylene oxide or propylene oxide adducts of the polyol).

As the dibasic acid that is used to form the aminopolyester polyol, any of the dicarboxylic acids of the aliphatic, aromatic, or alicyclic type can be used. The aliphatic dicarboxylic acid contains 3 to 30 carbon atoms, the examples of which include succinic acid, malonic acid, glutaric acid, adipic acid, azelaic acid, sebacic acid, pimelic acid, suberic acid, undecanedioic acid, dodecanedioic acid, tridecanedioic acid, etc. The aromatic dicarboxylic acid contains 8 to 30 carbon atoms, the examples of which include phthalic acid, isophthalic acid, terephthalic acid, naphthalene dicarboxylic acid, etc. The alicyclic dicarboxylic acids contains 8 to 30 carbon atoms, the examples of which include cyclohexanedicarboxylic acid, 4,4'-dicyclohexylmethanedicarboxylic acid, etc. As esters of the dicarboxylic acids, esters that are obtained from the dicarboxylic acid and low-aliphatic mono-ols containing 1-5 carbon atoms can be used.

When an aminopolyester polyol is being prepared, it is possible to use other diols than those listed above as needed. As such diols, there are aliphatic diols that contains 2-20 carbon atoms, and preferably 4-10 carbon atoms, and/or polyoxyalkylene glycols that have the molecular weight of 100-2000, and preferably of 200-1000. Examples of the diols include ethylene glycol, propylene glycol, butanediol, hexanediol, neopentyl glycol, etc. Examples of the polyoxyalkylene glycols include polyethylene glycol, polypropylene glycol, etc.

This aminopolyester polyol can be synthesized by the direct esterification method using dicarboxylic and aminediol and another diols if needed. Alternatively, the ester exchange method can be employed in which an ester of the above dicarboxylic acid, the aminediol, and other diols, if needed, can be reacted. Of these methods, the direct esterification method is preferable. With the ester exchange method, it is necessary to use a large excess of aminediol; a metal catalyst is needed; and an ester bond often remains at the termini of the polyester obtained; all of these are demerits.

For the preparation of aminopolyester polyol by the direct esterification method, a mixture with a molar ratio of the aminediol and the dicarboxylic acid of 1.70-1.05, and preferably 1.30-1.10, is used for the reaction. At that time, a strong acid such as phosphorous acid, phosphoric acid, or p-toluenesulfonic acid is used in the range of 0.01-5.00 mole % with respect to the dicarboxylic acid, and preferably in the range of 0.1-2.0 mole %. In the esterification reaction, first, a mixture stirred under a stream of nitrogen at atmospheric pressure is heated at 130°-270° C., and preferably at 150°-240° C., over a 1- to 6-hour period, and preferably over a 2- to 4-hour period, during which the water that is produced is removed. Next, the pressure is decreased from atmospheric pressure to 3.0 mmHg or less, and preferably 1.0 mmHg or less, over 0.1 to 3 hours, and preferably for 0.5-2 hours, and under this reduced pressure, the reaction is allowed to continue for 0.1-5 hours, and preferably for 0.5-3 hours. The aminopolyester polyol that is obtained in this way has the number average molecular weight of 200-8000, and preferably 500-4000; the amount of basic nitrogen is 1.0-12.0%, and preferably 2.0-8.0%. Of the aminopolyester polyol that is obtained by this method, the aminopolyester polyol obtained with the use of 4-N,N-dialkyleneaminopropyl-4-aza-2,6-heptanediol in which the alkyl group contains 1 to 6 carbon atoms as the aminediol is particularly suitable. As the catalyst used for polymerization, phosphorous acid is particularly suitable.

The aminopolyamide polyamine that is used in this invention is obtained by the reaction of dibasic acid with an aminodiamine that has one of the structures shown in the general formulae V and/or VI. As the dibasic acid that is used for the preparation of the aminopolyamide polyamine, it is possible to use aliphatic and/or alicyclic dicarboxylic acid. As this kind of aliphatic or alicyclic dicarboxylic acid, either of the aliphatic or the alicyclic dicarboxylic acids that were used at the time of the preparation of the aminopolyester polyol can be used.

At the time of the preparation of the aminopolyamide polyamine, it is possible to use diamines other than those with the structures shown in general formulae V and VI, as needed. As such diamines, diamines that contains 4 to 20 carbon atoms that are aliphatic, alicyclic, or aromatic diamines such as tetramethylenediamine, piperazine, hexamethylenediamine, octamethylenediamine, decamethylenediamine, cyclohexyldiamine, 4,4'-dicyclohexylmethanediamine, xylylenediamine and the like can be used.

The aminopolyamide polyamine can be obtained by the reaction of the aminodiamine and the dicarboxylic acid at the molar ratio of 1.02-2.00, and preferably at the ratio of 1.05-1.70. For example, first, a 10-90%, and preferably 30-70%, aqueous solution of the aminodiamine and dicarboxylic acid at a ratio in the above ranges is put into a reaction vessel. This is heated under high pressure at 120°-290° C., and preferably at 150°-260° C., over a reaction period of 1 to 10 hours, and preferably 2 to 6 hours, during which the water that is produced is removed. Next, after the pressure of the reaction system is released to atmospheric pressure, the pressure is decreased to 5 mm Hg or less, and preferably 1 mm Hg, over the next 0.5-5 hours, preferably, 1-3 hours. Under this reduced pressure, the reaction mixture is heated to 180°-270° C., and preferably 200°-250° C., resulting in aminopolyamide polyamine. The molecular weight of the aminopolyamide polyamine obtained is 200-8000, and preferably 500-4000; the amount of basic nitrogen is 1.0-12.0%, and preferably 2.0-8.0%.

The aminopolyether polyol used in this invention can be obtained by the polycondensation of aminediol of one of the structures of formulae II-IV with the use of a strongly acidic catalyst. As the strong acid used as catalyst, there are phosphorous acid, hypophosphorous acid, pyrophosphoric acid, p-toluenesulfonic acid, methanesulfonic acid, etc., and the like, and these can be used in the range of 0.01-8 mole %, and preferably 0.1-3 mole %, with respect to the aminediol.

Together with the aminediols of formulae II-IV, other diols can be used as needed. As such diols, there are aliphatic or alicyclic diols containing 2-20 carbon atoms, and/or polyoxyalkylene glycols that have the molecular weight of 150-2000. Examples of such aliphatic and alicyclic diols include ethylene glycol, propylene glycol, butanediol, neopentyl glycol, cyclohexanedimethanol, etc. Examples of such polyoxyethylene glycols include polyethylene glycol, polypropylene glycol, polytetramethylene glycol, etc.

For the preparation of aminopolyether polyol, first, at least one of the aminediols shown by the general formulae II-IV is mixed with another diol if necessary, the catalyst is added, and the reaction is allowed to proceed at atmospheric pressure at 150°-270° C., and preferably at 200°-250° C., with removal of the water that is produced, for from 1 to 30 hours, and preferably for 3 to 20 hours. Then, the pressure of the reaction system is decreased over 0.5 to 6 hours to 10 mm Hg or less and preferably to 3 mm Hg or less, preferably 1-4 hours. Under this reduced pressure and at the temperatures mentioned above, the reaction is carried out for 1-10 hours, and preferably for 2-7 hours, resulting in aminopolyether polyol with the molecular weight of 200-8000, and preferably 500-4000. The amount of basic nitrogen of this aminopolyether polyol is 1.0-15.0%, and preferably 2.0-11.0%. Of the aminopolyether polyols, the one obtained with the use of aminediol with the structure of general formula II is particularly suitable.

During the preparation of polyurethane or polyurethaneurea as will be described below, aminopolyester polyol, aminopolyamide polyamine, and aminopolyether polyol obtained by the methods given above are used so that the amount of tertiary amino groups in their molecules included in the resulting polyurethane or polyurethaneurea is at the proportions of 0.01-3.00 mmol/g, and preferably 0.05-2.00 mmol/g.

In the preparation of the polyurethane or polyurethaneurea of this invention, the other polyols or polyamines that are used when necessary are, for example, chain-extending agents of low molecular weight or polyols of high molecular weight. As the chain-extending agent, diols, diamines, and oxyalkylene glycols can be used. The diols mentioned above include aliphatic and/or alicyclic diols that contains 2 to 20 carbon atoms such as ethylene glycol, propylene glycol, 1,4-butanediol, neopentyl glycol, 1,5-pentanediol, 1,6-hexanediol, 1,4-cyclohexanedimethanol, 1,3-cyclohexanedimethanol, etc. The diamines mentioned above include aliphatic and/or aromatic diamines such as ethylenediamine, propylenediamine, 1,4-tetramethylenediamine, 1,6-hexamethylenediamine, 1,4-diaminocyclohexane, 4,4'-diaminodiphenylmethane, xylylenediamine, etc. The oxyalkylene glycols mentioned above include oxyalkylene glycols that contains 5 to 30 carbon atoms such as diethylene glycol, triethylene glycol, tetraethylene glycol, dipropylene glycol, tripropylene glycol, tetrapropylene glycol, etc. In these chain extending agents of low molecular weight, especially preferred are ethylene glycol, 1,4-butanediol, 1,6-hexanediol, neopentyl glycol, ethylenediamine, 1,2-propylenediamine, 1,4-butylenediamine, and 1,6-hexamethylenediamine.

As the polyols of high molecular weight, there are polyoxyalkylene glycols and polyesterdiols. As the polyoxyalkylene glycols, it is possible to use polyethylene glycols, polypropylene glycols, polytetramethylene glycols, and the like with the molecular weight of 300-15,000, and preferably of 800-8,000. As polyesterdiols, there are polyesterdiols obtained from aliphatic diols with a carbon number of 2-10 and aliphatic dicarboxylic acids with a carbon number of 6-16; polyesterdiols obtained from caprolactons such as ε-caprolacton; and the like. Of these polyols with high molecular weight, the polyesterdiols are preferable. The proportion of the polyol of high molecular weight in the polyurethane or polyurethaneurea is 50% or less, and preferably 30% or less.

The polyurethane or polyurethaneurea of this invention can be prepared by any of the well-known methods. For example, in the preparation of the polyurethane by the solution polymerization method, first, polysiloxane with terminal hydroxyl groups and with the structure shown in general formula I (below, called "polysiloxane polyol"), isocyanate, and if needed, the polyol of high molecular weight mentioned above are dissolved in a solvent inactive toward the isocyanate radical, and are allowed to react for 5 to 300 minutes, and preferably for 15-120 minutes, at the temperature of 30°-150° C., and preferably 40°-120° C., with stirring in an atmosphere of nitrogen. When the polyurethane is prepared with the use of aminediols with one of the structures shown in general formulae II-IV, said aminediol and, when needed, the chain-extending agent of low molecular weight (low-molecular-weight diol) are added to the above reaction mixture and the chain-extension reaction is allowed to proceed at 10°-100° C., and preferably at 20°-80° C., for 15-300 minutes, causing the molecular weight of the product to increase. When in place of the aminediol, aminopolyester polyol and/or aminopolyether polyol are used, said aminopolyester polyol and/or aminopolyether polyol, with the chain extending agent of low molecular weight when needed, are added to the reaction mixture, and the chain-extension reaction is allowed to proceed at 0°-100° C., and preferably at 5°-80° C. for 15-300 minutes, resulting in a product with high molecular weight.

In any of these cases, as the solvent, dioxane, tetrahydrofuran, chloroform, carbon tetrachloride, benzene, toluene, acetone, methyl ethyl ketone, N,N-dimethylformamide, N,N-dimethylacetamide, N-methylpyrrolidone, and the mixtures thereof, etc., can be used. In particular, dioxane, tetrahydrofuran, methyl ethyl ketone, N,N-dimethylformamide, N,N-dimethylacetamide, and the mixtures thereof are preferable. At the time of reaction, when necessary, a polymerization catalyst is added. As the catalyst, tin catalysts such as dibutyltin dilaurate and the like, titanium catalysts such as titanium tetrabutoxide, and other metal catalysts can be used. The catalyst can be added at the proportion of 1-500 ppm, and preferably 5-100 ppm, to the reaction mixture. In the preparation of polyurethane, the method of fusion polymerization can be used in which the whole monomers are put in the reactor at once.

In the polymerization reaction mentioned above, the molar ratios of the mixture of the various ingredients when polyurethane is being prepared with the use of aminediols are as follows: the molar ratio of polysiloxane polyol to aminediol is from 100/1 to 1/10, and preferably from 20/1 to 1/5; the molar ratio of aminediol to polyol (when its use is necessary) is 1/20 to 1/0, and preferably 1/10 to 10/1; and the molar ratio of all kinds of polyol to diisocyanate is 10/8 to 8/10, and preferably 10/9 to 9/10.

When, in place of aminediol, polyurethane is prepared with the use of aminopolyester polyol and/or aminopolyether polyol of relatively high molecular weight, the molar ratios of the various ingredients are as follows: the molar ratio of polysiloxane polyol to aminopolyester polyol and/or aminopolyether polyol is 100/1 to 1/10, and preferably 20/1 to 1/5; the molar ratio of polysiloxane polyol plus aminopolyester polyol and/or aminopolyether polyol to polyol (that is a chain-extending agent of low molecular weight to be used as necessary) is 1/100 to 1/1, and preferably 1/30 to ½; and the molar ratio of all kinds of polyol to diisocyanate is 10/8 to 8/10, and preferably 10/9 to 9/10.

The polyurethane of this invention can be prepared by any of the well-known methods for the preparation of polyurethane. Of those methods, the solution polymerization method is particularly suitable. In the solution polymerization method, the preparation of polyurethane with the use of aminodiamine is as follows. At the time of the preparation of polyurethane, polysiloxane polyol and a polyol of high molecular weight can be used when necessary, and when these are used, first of all, these compounds and the diisocyanate are dissolved in an inert solvent. Then, in the same way as above for polyurethane, reaction is carried out at 30°-150° C., and preferably at 50°-100° C., for 5 to 300 minutes, and preferably for 15-120 minutes. The reaction mixture is cooled to 0°-40° C., and preferably to 5°-20° C., and a mixture of polysiloxane that has terminal amino groups or substituted amino groups and that has the structure shown in general formula I (below, abbreviated "polysiloxane polyamine"), an aminodiamine that has one of the structures shown in general formulae V or VI, and a chain-extending agent of low molecular weight (i.e., low-molecular-weight diamine) dissolved in an inert solvent is added dropwise, resulting in a polyurethane with the desired molecular weight.

When polyurethaneurea is prepared with the use of polyamide polyamine of relatively high molecular weight in place of the aminodiamine by the solution polymerization method, the reaction procedure is as follows. When this kind of polyurethaneurea is being prepared, it is possible to use a polysiloxane polyol, aminopolyester polyol, aminopolyether polyol, polyols of high molecular weight, and the like, when necessary. In that case, first, these compounds are dissolved in a solvent that is inactive to isocyanate. Then, as described above for polyurethane, a reaction is carried out for 5 to 300 minutes, and preferably for 15 to 120 minutes, at $0°-150°$ C., and preferably $10°$ to $100°$ C. The reaction mixture is cooled to $0°-40°$ C., and preferably to $5°-20°$ C. Next, a solution that contains the polysiloxane polyamine that has the structure shown in general formula I, aminopolyamide polyamine, and a chain-extending agent of low molecular weight (i.e., a low-molecular-weight diamine) in an inactive solvent is dropped into the reaction mixture, resulting in a polyurethaneurea with the desired molecular weight.

In the reaction for the preparation of the polyurethaneurea, the polymer produced has urea bonds, so the solvents that can be used are amide-type solvents such as N,N-dimethylformamide, N,N-dimethylacetamide and N-methylpyrrolidone. Alternatively, solvent mixtures of these solvents with dioxane or tetrahydrofuran, etc., can be used. To increase the solubility of the polymer that is produced, addition of salts such as LiCl, LiBr, $CaCl_3$, or the like is recommended. The proportions of the various ingredients and the other reaction conditions should be as for the preparation of the polyurethane.

The polyurethane or polyurethaneurea of this invention obtained in this way can be used in artificial heart-lung machines as a gas-permeable material formed into hollow fibers or a thin membrane as described below. The tertiary amino groups in the molecules of the polyurethane or polyurethaneurea of this invention can be converted into quarternary ammonium groups, and the polyurethane or polyurethaneurea can be bound with heparin and/or the analogs thereof (hereinafter, "heparin" means heparin and the analogs thereof) via the quarternary ammonium groups. In this way, the compatibility of the polyurethane or polyurethaneurea with blood is increased. The binding with heparin is accomplished by the treatment of the polyurethane or polyurethaneurea with an agent that converts the tertiary amino groups in the molecule into quarternary ammonium groups, and then by the treatment with heparin, resulting in formation of a polyion complex. As this kind of an agent, at least one compound selected from the group consisting of alkyl halides, aralkyl halides, aryl halides, and dialkyl halides with a carbon number of 1-30, and preferably of 1-15, can be used. Of these agents, alkyl halides with a carbon number of 2-12, and preferably of 2-8, are most preferable. The agent should be used at the proportion of 0.1-10.0 moles, and preferably at the proportion of 0.5-5.0 moles per mole of tertiary amino groups in the polymer. The change from the tertiary amino group in the polyurethane or polyurethaneurea to the quarternary ammonium group can be accomplished by the method in which, for example, these polymers are dissolved in an appropriate solvent, after which the agent is added for reaction. Alternatively, the method can be used in which the polymer (i.e. the polyurethane or polyurethaneurea) is first formed into a desired product (e.g., a membrane) and then the polymer is allowed to come into contact with a solution of the agent. The method in which the reaction proceeds in solution is preferable. For example, the agent is added to a solution of polyurethane or polyurethaneurea, and the reaction is allowed to proceed for 0.1-60 hours, and preferably for 1-30 hours, at the temperature of $20°-100°$ C., and preferably $40°-80°$ C. The ratio of quarternary ammonium groups in the resulting polymer to the original tertiary amine groups is 1-100%, and preferably 10% or more.

The polyurethane or polyurethaneurea that contains quarternary ammonium groups can be formed into desired products such as membranes, hollow fibers, or the like. By the bringing of these products into contact with heparin, the said heparin is bound to the surface of the product (i.e., heparinization is accomplished). For example, the product made of polyurethane or polyurethaneurea that has quarternary ammonium groups is immersed in an aqueous solution containing heparin at the concentration of 0.1-10%, and preferably at 0.5-5%, at the temperature of $20°-100°$ C., and preferably at $40°-80°$ C., for 0.1-10 hours, and preferably 0.5-4 hours, by which heparinization is accomplished. The heparins used here can include heparin; chondroitin sulfate, a natural or synthetic compound of high molecular weight that contains $-SO_3H$, $-NHSO_3H$, or the like.

The polyurethane or polyurethaneurea of this invention can be formed by conventional methods into hollow fibers or made into thin membranes by its being poured over a flat surface when dissolved in an appropriate solvent and then dried. When needed, it can be heparinized as described above, and formed into the desired gas-permeable products. The material of this invention allows the exchange of gases (i.e., oxygen and carbon dioxide) when used as an oxygen-exchange membrane in artificial heart-lung machines. Moreover, because the compatibility of said material with the blood is excellent, the risk of the occurrence of symptoms of shock or the like arising from the coagulation of the blood or the activation of complement is very small. When material that has been heparinized is used, the anti-coagulation properties are further enhanced, because heparin is released slowly from the surface of the polymer. This kind of material can also be used effectively for ECMO that substitute for lung function for long periods of time. Furthermore, the material of this invention can be used in oxygen-enrichment membranes for oxygen inhalation therapy of patients with respiratory disorders, for gas-combustion oxygen enrichment membranes, and the like. Because of its excellent anti-thrombogenicity properties, this material can be recommended for use as a coating material for medical devices that are to be used in contact with blood.

(EXAMPLES)

Below, this invention will be explained with reference to examples. In the examples, unless particularly indicated, the term "parts" refers to "parts by weight."

EXAMPLE 1

In 640 parts by volume of anhydrous dioxane, 180 parts of polydimethylsiloxane diol with the following general formula VII and with a number average molecular weight of 1800, 13.52 parts of 3-n-butyl-3-aza-1,5-pentanediol, 9.01 parts of 1,4-butanediol, and 78.08 parts of 4,4-diphenylmethanediisocyanate (abbreviated MDI below) were dissolved.

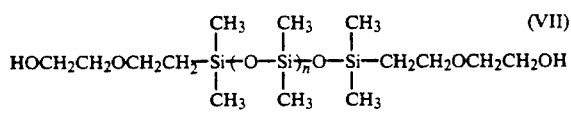

(VII)

To this solution, 0.0139 parts of dibutyltin dilaurate in 7 parts by volume of anhydrous dioxane was added as catalyst, and the mixture was allowed to react at 30° C. for 1 hour and then at 60° C. for 2 more hours, resulting in a solution of base polymer A with a polymer concentration of 30% and a viscosity of 1,700 poise at 25° C. Then, dioxane was added to the solution with stirring to give a 5% solution. Ten grams of the 5% solution was applied uniformly to the surface area (100 $cm^2$) of a glass plate held horizontal, and dried under a stream of nitrogen first at 40° C. for 1 hour and then at 60° C. for 2 hours. Then, drying was continued at 60° C. under reduced pressure for 15 hours, resulting in a base polymer film A 50 μm thick.

To 100 parts of a 10% solution of base polymer A obtained by dilution with dioxane, 3.37 parts of ethyl iodide was added, and the reaction was allowed to proceed with stirring at 70° C. for 5 hours. In this way, the tertiary amino groups in the base polymer were converted into quarternary ammonium groups. This solution was diluted with dioxane to 5%, and in the same way as for the base polymer A above, a polymer film 50 μm thick with quarternary ammonium groups was obtained.

About 0.2 g of the base polymer film A and 0.2 g of the polymer film with quaternary ammonium groups were carefully weighed respectively, and each of the films was dissolved in 50 parts by volume of a dioxane-ethanol mixture (7:3 by volume), and measured for the amount of basic nitrogen by means of a potentiometer (Hiranuma Seisakusho Co.; Comtite-7). The solution of each polymer film was titrated with N/10 $HClO_4$ dioxane solution, and the amount of basic nitrogen was calculated from the point of inflection of the titration curve. The amount of basic nitrogen of base polymer film A was 0.360 mmol/kg, and that of the polymer film A with quarternary ammonium groups was 0.252 mmol/g. These results showed that the degree of quarternarization was about 30%.

Next, the oxygen permeation coefficients of these films were measured by means of an apparatus for measuring gas permeation (Yanagimoto Co., Ltd.). The oxygen permeation coefficient of the base polymer film A was $2.02 \times 10^{-8}$ $cm^3$ (STP) $cm/cm^2.sec.cmHg$, and that of the polymer film A with quarternary ammonium groups was $1.98 \times 10^{-8}$ (here and below, the units "$cm^3$ (STP).$cm/cm^2$.sec.cmHg" will be omitted).

Then, both films were treated with heparin by being immersed in a 1% aqueous solution of heparin for 2 hours at 70° C. The resulting films were cut into circles with the diameter of 3 cm, and these samples were immersed for 1 week at 37° C. in physiological saline, rinsed thoroughly with distilled water, and dried by the blotting up of water on the film surfaces with filter paper. The film samples were affixed to the center area of watch glasses 10 cm in diameter. On the surface of the film, 200 μl of blood plasma of rabbit to which citric acid had been added was placed, and to this, 200 μl of an aqueous solution of calcium chloride at the concentration of 1/40M was added. The watch glasses were floated on water in a water bath at 37° C. The water was gently stirred and the time needed for coagulation of plasma to take place (i.e., until the plasma did not flow) from the time of the addition of the aqueous solution of calcium chloride was measured. The time obtained that was needed for coagulation of plasma was divided by the standard value. The standard value was obtained by measuring the time needed for coagulation on the watch glass without using the film samples. The results are shown in Table 1.

Next, the solution of base polymer A, the solution of base polymer A with quaternary ammonium groups, and the solution of base polymer A with quarternary ammonium groups that has been added heparin are diluted with dioxane to give 1% solutions. Then glass beads of 40-60 mesh were immersed in 100 ml of the solution for 30 minutes. The glass beads were obtained by filtration with a glass filter, dried for 3 hours at 40° C. under a stream of nitrogen, and dried for another 12 hours at 60° C. under reduced pressure, resulting in the polymer-coated glass beads. To a test tube made of plastic, 200 mg of these coated beads, 500 μl of veronal buffer, and 500 μl of serum (pooled serum from healthy persons) were added, and the mixture was incubated at 37° C. with gentle agitation for 30 minutes. Then the amounts produced of 50% Hemolytic unit of complement (abbreviated $CH_{50}$) and of C3a and C5a were measured. The results are shown in Table 1. For the measurement of $CH_{50}$, the method of Meyer (M. M. Meyer, "Complement and complement fixation", in *Experimental Immune Chemistry*, 2nd Ed., p. 133, Charles C. Thomas, Stuttgart, 1964) was used, and for the measurement of C3a and C5a, radioimmunoassay kits available from the Upjohn Co. were used.

TABLE 1

| | Relative coagulation time *1 | Activity of complement | | |
|---|---|---|---|---|
| | | $CH_{50}$ (%) | C3a (ng/ml) | C5a (ng/ml) |
| Base polymer film A | 2.50 | 90.3 | 750 | 230 |
| Polymer film A with quarternary ammonium groups | 3.12 | 98.0 | 300 | 150 |
| Base polymer film A + heparin | 2.35 | 91.7 | 720 | 250 |
| Polymer film A with quarternary ammonium groups + heparin | >10 | 100 | 30 | 70 |
| Glass | 1.00 | 100 | 130 | 570 |

*1 Relative coagulation time = $\frac{\text{Coagulation time (sec) on sample of film}}{\text{Coagulation time (sec) on glass}}$

EXAMPLE 2

In 667 parts by volume of anhydrous dioxane, 180 parts of polydimethylsiloxane diol of general formula VII and with a number average molecular weight of 1800, 21.83 parts of 3-N,N-diethylaminopropyl-3-aza-1,5-pentanediol, 9.01 parts of 1,4-butanediol, and 75.0 parts of MDI were dissolved. To this solution, 0.0139 parts of dibutyltin dilaurate dissolved in 7 parts by volume of dioxane was added as catalyst, and the procedures of Example 1 were repeated, resulting in a solution of base polymer B with a polymer concentration of 30% and a viscosity of 2300 poise at 25° C. To this solution of base polymer B, ethyl iodide was added, and according the procedure of Example 1, a base polymer film B, polymer film B with quarternary ammonium groups, and heparinized polymer film B with quarternary ammonium groups were obtained. The amount of basic nitrogen was 0.699 mmol/g for the base polymer film B and 0.342 mmol/g for the polymer film B with quarternary ammonium groups. These results showed that the extent of quarternization was about 51%.

Next, as in Example 1, the oxygen permeation coefficient, relative coagulation time, complement activity, and physical properties (strength and elongation) were examined. The results are shown in Table 2.

EXAMPLE 3

In 1190 parts by volume of anhydrous dioxane, 320 parts of polydimethylsiloxane polyol of general formula VII and with a number average molecular weight of 3200, 49.28 parts of 4-N,N-diethylaminopropyl-4-aza-2,6-heptanediol, 18.02 parts of 1,4-butanediol, and 125.1 parts of MDI were dissolved. To this solution, 0.0139 parts of dibutyltin dilaurate dissolved in dioxane was added as catalyst, and the procedures of Example 1 were repeated, resulting in a solution of base polymer C with a polymer concentration of 30% and a viscosity of 1700 poise at 25° C. A polymer film C with quarternary ammonium groups, heparinized polymer film C with quarternary ammonium groups, and coated glass beads were prepared as in Example 1. The amount of basic nitrogen in the base polymer film C and in the polymer film C with quarternary ammonium was 0.781 mmol/g and 0.401 mmol/g, respectively. Therefore, the extent of quaternization was 48.7%. Next, as in Example 1, the oxygen permeation ratio, relative coagulation time, complement activity, and physical properties were examined. The results are shown in Table 2.

EXAMPLE 4

In 1050 parts by volume of anhydrous dioxane, 320 parts of polydimethylsiloxane polyol of general formula VII and with a number average molecular weight of 3200, 14.72 parts of 2-N,N-dimethylaminomethyl-2-methyl-1,3-propanediol, 18.02 parts of 1,4-butanediol, and 100.08 parts of MDI were dissolved. To this solution, 0.0139 parts of dibutyltin dilaurate dissolved in dioxane was added as catalyst, and the procedures of Example 1 were repeated, resulting in a solution of base polymer D with a polymer concentration of 30% and a viscosity of 2300 poise at 25° C. A polymer film D with quarternary ammonium groups, heparinized polymer film C with quarternary ammonium groups, and coated glass beads were prepared as in Example 1. The amount of basic nitrogen in the base polymer film D and the polymer film C with quarternary ammonium groups was 0.221 mmol/g and 0.108 mmol/g, respectively. Therefore, the extent of quarternization was 51%. Next, as in Example 1, the oxygen permeation ratio, relative coagulation time, complement activity, and physical properties were examined. The results are shown in Table 2.

EXAMPLE 5

In 506 parts by volume of anhydrous dioxane, 150 parts of polydimethylsiloxane polyol of following general formula VIII and with a number average molecular weight of 1500, 20.02 parts of N,N-di(β-hydroxyethyl)-2,5-dimethylpiperazine, and 50.04 parts of MDI were dissolved.

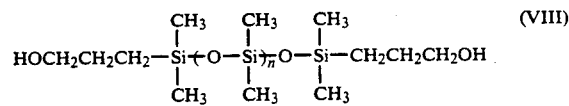

To this solution, 0.0139 parts of dibutyltin dilaurate dissolved in dioxane was added as catalyst, and the procedures of Example 1 were repeated, resulting in a solution of base polymer E with a polymer concentration of 30% and a viscosity of 1020 poise at 25° C. Polymer film E with quarternary ammonium groups, heparinized polymer film E with quarternary ammonium groups, and coated glass beads were prepared as in Example 1. The amount of basic nitrogen in the base polymer film E and the polymer film E with quarternary ammonium groups was 0.909 mmol/g and 0.489 mmol/g, respectively. Therefore, the extent of quarternization was 46%. Next, as in Example 1, the oxygen permeability coefficient, relative coagulation time, complement activity, and physical properties were examined. The results are shown in Table 2.

EXAMPLE 6

In 616 parts by volume of a 1:1 mixture by volume of anhydrous dioxane and dimethylacetamide, 180.0 parts of polydimethylsiloxane polyol of general formula VIII and with a number of average molecular weight of 1800, 9.01 parts of 1,4-butanediol, 75.06 parts of MDI, and 0.015 parts of dibutyltin dilaurate were dissolved, and the mixture was allowed to react for 1 hour at 60° C. under a stream of nitrogen in a polymerization apparatus for polyurethane, and was cooled for 30 minutes with ice water. To this prepolymer solution, 19.42 parts of 3-N,N-diethylaminoethyl-3-aza-1,5-diaminopentane in 64.7 parts of a mixture of dioxane (30%) and dimethylacetamide (70%) was added dropwise over 1 hour, resulting in a solution of base polymer F with a viscosity of 980 poise at 25° C. Then, except for the use of a mixture of dioxane and dimethylacetamide as the solvent for dilution, the procedures of Example 1 were repeated to prepare base polymer F and polymer film F with quarternary ammonium groups. Furthermore, heparinization of the film and preparation of coated glass beads were carried out. The amount of basic nitrogen in the base polymer film F and the polymer film F with quarternary ammonium groups was 0.705 mmol/g and 0.388 mmol/g, respectively, which showed that the extent of quarternization was 45%. The various properties listed as being examined in Example 1 were examined here, and the results are shown in Table 2.

COMPARATIVE EXAMPLE 1

In 637 parts by volume of anhydrous dioxane, 180.0 parts of polydimethylsiloxane polyol of general formula VII and with a number average molecular weight of 1800, 18.02 parts of 1,4-butanediol, 75.06 parts of MDI, and 0.015 parts of dibutyltin dilaurate were dissolved, and the reaction was carried out as in Example 1, resulting in a solution of base polymer G with a polymer concentration of 30% and a viscosity of 750 poise at 25° C. Furthermore, the procedures of Example 1 were repeated to prepare polymer films and coated beads. The various properties listed as being examined in Example 1 were examined here, and the results are shown in Table 2.

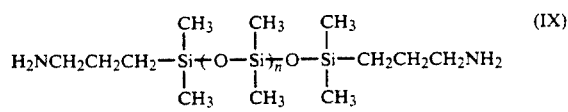

and 24.4 parts of 4-N,N-diethylaminopropyl-4-aza-1,7-

TABLE 2

| | Polymer | Oxygen Permeability* Coefficient ($\times 10^{-8}$) | Relative coagulation Time (Glass = 1.00) | Complement Activity $CH_{50}$ (%) | Strength ($Kg/mm^2$) | Elongation (%) |
|---|---|---|---|---|---|---|
| Examples | B Base polymer | 2.30 | 2.33 | 88.0 | 1.73 | 660 |
| | Polymer with guarternary ammonium groups | 2.33 | 3.01 | 95.1 | 1.81 | 645 |
| | Polymer with guarternary ammonium groups + heparin | 2.25 | >10 | 97.7 | 1.77 | 630 |
| | C Base polymer | 3.88 | 2.78 | 87.3 | 2.31 | 680 |
| | Polymer with guarternary ammonium groups | 3.76 | 3.44 | 96.6 | 2.11 | 675 |
| | Polymer with guarternary ammonium groups + heparin | 3.76 | >10 | 98.3 | 2.20 | 630 |
| | D Base polymer | 4.02 | 2.58 | 89.2 | 2.15 | 673 |
| | Polymer with guarternary ammonium groups | 4.10 | 2.62 | 93.1 | 2.13 | 665 |
| | Polymer with guarternary ammonium groups + heparin | 4.15 | >10 | 97.7 | 2.22 | 623 |
| | E Base polymer | 3.06 | 2.23 | 88.2 | 2.68 | 705 |
| | Polymer with guarternary ammonium groups | 3.11 | 2.54 | 92.6 | 2.45 | 680 |
| | Polymer with guarternary ammonium groups + heparin | 3.23 | >10 | 95.5 | 2.52 | 675 |
| | F Base polymer | 1.55 | 1.78 | 83.4 | 2.00 | 650 |
| | Polymer with guarternary ammonium groups | 1.78 | 2.11 | 90.6 | 1.95 | 643 |
| | Polymer with guarternary ammonium groups + heparin | 1.77 | >10 | 94.8 | 1.98 | 627 |
| Comparative Example | G | 1.23 | 1.43 | 80.3 | 1.43 | 630 |

*in $cm^3(STP)cm/cm^2$ sec · cmHg

As is clear from Table 2, the polyurethane, polyurethaneurea, and their derivative polymers having quarternary ammonium groups, and heparinized polymers obtained from a composition that comprises polysiloxane polyols have properties superior to the polymer of the comparative example, especially in term of their inhibition of blood clotting and complement activation.

EXAMPLE 7

In 100 parts by volume of N,N-dimethylformamide (abbreviated DMF below), 9.01 parts of 1,4-butanediol and 75.08 parts of MDI were dissolved. To this solution, 0.0139 part of dibutyltin dilaurate dissolved in 7 parts by volume of DMF was added as catalyst, and the mixture was allowed to react for 1 hour at 30° C., and then cooled with ice for 20 minutes. To this, 200.0 parts of polysiloxane polyamine of the following general formula IX and with the number average molecular weight of 2000, diaminopentane dissolved in 620 parts by volume of a mixture of dioxane and DMF (1:1 by volume; below, abbreviated "solvent mixture") were added dropwise over for 1 hour, resulting in a base polymer solution H with a polymer concentration of 30% and a viscosity of 1400 poise at 25° C. To this solution, the solvent mixture was added and stirred to give a homogeneous 5% solution. This solution was treated as in Example 1 to give a base polymer film H. In the preparation of the base polymer film H, drying was carried out at 40° C. for 1 hour under a stream of nitrogen at 60° C. for 15 hours, and then at 60° C. for 15 hours under reduced pressure.

Next, the base polymer solution was diluted to 10% with the solvent mixture, and according to the procedure of Example 1, polymer film H with quarternary ammonium groups and heparinized polymer film H with quarternary ammonium groups were obtained. The amount of basic nitrogen in the base polymer film H and the polymer film H with quarternary ammonium was 0.815 mmol/g and 0.400 mmol/g, respectively. Therefore, the extent of quarternization was 51%.

Next, as in Example 1, the oxygen permeation coefficient, relative coagulation time, complement activity, and physical properties (strength and elongation) were examined. The results are shown in Table 3.

EXAMPLE 8

In 100 parts of DMF, 11.8 parts of 1,6-hexanediol and 75.08 parts of MDI were dissolved. To the solution, 0.0139 part of dibutyltin dilaurate dissolved in 7 parts by volume of DMF was added as catalyst, and the mixture was allowed to react for 1 hour at 30° C., and cooled for 20 minutes. To this reaction mixture, 150.0 parts of polysiloxane polyamine of general formula IX and with the number average molecular weight of 3000, and 32.4 parts of 4-N,N-dimethylaminopropyl-4-aza-1,7-diaminoheptane in 528 parts of the solvent mixture were added dropwise over 1 hour, resulting in a solution of base polymer I with a polymer concentration of 30% and a viscosity of 1280 poise at 25° C. This solution was treated as in Example 1, and base polymer film I, polymer film I with quarternary ammonium groups, and heparinized polymer film I with quarternary ammonium groups were obtained. The amount of basic nitrogen in the base polymer film I and the polymer film I with quarternary ammonium groups was 1.114 mmol/g and 0.522 mmol/g, respectively. Therefore, the extent of quarternization was 53.2%. Next, as in Example 1, the oxygen permeation coefficient, relative coagulation time, complement activity, and physical properties (strength and elongation) were examined. The results are shown in Table 3.

EXAMPLE 9

In 100 parts by volume of DMF, 78.7 parts of 4,4-dicyclohexylmethane diisocyanate and 9.01 parts of 1,4-butanediol were dissolved. To this solution, 0.0139 parts of dibutyltin dilaurate dissolved in 7 parts by volume of DMF was added as catalyst, allowed to react for 2 hours at 60° C., and cooled with ice for 20 minutes. To this reaction mixture, a solution containing 150 parts of polysiloxane polyamine of general formula IX and with the number average molecular weight of 3000 and 30.0 parts of N,N-di(γ-aminopropyl) piperazine in 518 parts by volume of the solvent mixture were added dropwise over 1 hour, resulting in a solution of base polymer J with a polymer concentration of 30% and a viscosity of 1330 poise at 25° C. This solution was treated as in Example 1, and base polymer film J, polymer film J with quarternary ammonium groups, and heparinized polymer film J with quarternary ammonium groups were obtained. The amount of basic nitrogen in the base polymer film J and the polymer film J with quarternary ammonium groups was 1.121 mmol/g and 0.653 mmol/g, respectively. Therefore, the extent of quarternization was 41.7%.

Next, as in Example 1, the oxygen permeation coefficient, relative coagulation time, complement activity, and physical properties (strength and elongation) were examined. The results are shown in Table 3.

EXAMPLE 10

In 100 parts by volume of DMF, 75.08 parts of MDI and 9.01 parts of 1,4-butanediol were dissolved. To this solution, 0.0139 parts of dibutyltin dilaurate dissolved in 7 parts by volume of DMF was added as catalyst, allowed to react for 1 hour at 30° C., and cooled with ice for 20 minutes. To this reaction mixture, a solution containing 150 parts of polysiloxane polyamine of general formula IX and with the number average molecular weight of 3000 and 34.5 parts of 4-N,N-diethylaminoethyl-4-aza-1,7-diaminoheptane in 520 parts by volume of the solvent mixture were added dropwise over 1 hour, resulting in a solution of base polymer K with a polymer concentration of 30% and a viscosity of 1120 poise at 25° C. This solution was treated as in Example 1, and base polymer film K, polymer film K with quarternary ammonium groups, heparinized polymer film K with quarternary ammonium groups were obtained. The amount of basic nitrogen in the base polymer film K and the polymer film K with quarternary ammonium groups was 1.117 mmol/g and 0.607 mmol/g, respectively. Therefore, the extent of quarternization was 45.7%. Next, as in Example 1, the oxygen permeation coefficient, relative coagulation time, complement activity, and physical properties (strength and elongation) were calculated. The results are shown in Table 3.

COMPARATIVE EXAMPLE 2

In 100 parts by volume of DMF, 75.08 parts of MDI and 9.01 parts of 1,4-butanediol were dissolved. To this solution, 0.0139 parts of dibutyltin dilaurate dissolved in 7 parts by volume of DMF was added as catalyst, and the mixture was allowed to react for 1 hour at 30° C., and then cooled with ice for 20 minutes. To this reaction mixture, a solution containing 150 parts of polysiloxane polyamine of general formula IX and with the number average molecular weight of 3000 and 11.1 parts of 1,2-propylenediamine in 465 parts by volume of the solvent mixture were added dropwise over 1 hour, resulting in a solution of base polymer L with a polymer concentration of 30% and a viscosity of 310 poise at 25° C. This solution was treated as in Example 1, and base polymer film L, polymer film L with quarternary ammonium groups, and heparinized polymer film L with quarternary ammonium groups were obtained. Both the amount of basic nitrogen in the base polymer film L and the polymer film L with quarternary ammonium groups was 0 mmol/g. Next, as in Example 1, the oxygen permeation coefficient, relative coagulation time, complement activity, and physical properties (strength and elongation) were calculated. The results are shown in Table 3.

TABLE 3

| | | Polymer | Oxygen Permeability* Coefficient ($\times 10^{-8}$) | Relative Coagulation Time (Glass = 1.00) | Complement Activity $CH_{50}$ (%) | Strength (Kg/mm$^2$) | Elongation (%) |
|---|---|---|---|---|---|---|---|
| Examples | H | Base polymer | 2.10 | 2.12 | 93.3 | 2.11 | 603 |
| | | Polymer with quarternary ammonium groups | 2.22 | 2.55 | 93.0 | 2.11 | 610 |
| | | Polymer with quarternary ammonium groups + heparin | 2.25 | >10 | 98.0 | 2.30 | 600 |
| | I | Base polymer | 2.38 | 2.33 | 90.1 | 2.07 | 650 |
| | | Polymer with quarternary ammonium | 2.43 | 2.48 | 92.2 | 2.00 | 655 |

TABLE 3-continued

| Polymer | | Oxygen Permeability* Coefficient ($\times 10^{-8}$) | Relative Coagulation Time (Glass = 1.00) | Complement Activity $CH_{50}$ (%) | Strength (Kg/mm$^2$) | Elongation (%) |
|---|---|---|---|---|---|---|
| | groups Polymer with guarternary ammonium groups + heparin | 2.46 | >10 | 96.3 | 2.40 | 645 |
| J | Base polymer | 2.08 | 2.11 | 91.0 | 2.32 | 660 |
| | Polymer with guarternary ammonium groups | 2.12 | 2.77 | 91.7 | 2.10 | 657 |
| | Polymer with guarternary ammonium groups + heparin | 2.15 | >10 | 96.8 | 2.33 | 660 |
| K | Base polymer | 1.98 | 2.22 | 88.3 | 2.14 | 655 |
| | Polymer with guarternary ammonium groups | 2.00 | 2.33 | 89.0 | 2.20 | 670 |
| | Polymer with guarternary ammonium groups + heparin | 2.03 | >10 | 95.1 | 2.20 | 670 |
| Comparative Example L | Base polymer | 1.21 | 1.22 | 75.0 | 0.98 | 510 |
| | Polymer with guarternary ammonium groups | 1.15 | 1.20 | 73.0 | 0.97 | 500 |
| | Polymer with guarternary ammonium groups + heparin | 1.11 | 1.20 | 72.1 | 0.94 | 503 |

*in cm$^3$(STP)cm/cm$^2$ sec · cmHg

The results in Table 3 show that the polyurethaneurea, derivative polymers having quarternary ammonium groups, and heparinized polymers of this invention obtained by the use of polysiloxane polyamine have superior oxygen permeation and compatibility with blood as do the polymers of this invention shown in Table 2.

EXAMPLE 11

First, 3942 parts of 4-N, N-diethylaminopropyl-4-aza-2,6-heptanediol, 2924 parts of adipic acid, and 16.4 parts of phosphorous acid were put in an autoclave. Under a stream of nitrogen, the mixture was kept at 170°-230° C. for 2 hours with agitation while the water produced was removed. Next, to the reaction mixture, 946 parts of 1,6-hexanediol was added, and a reaction was carried out for an additional 90 minutes at 230° C. Then, while the temperature was kept at 230° C., the pressure was gradually reduced to 0.3 mmHg over 90 minutes. The reaction was further carried out for 2 hours at 230° C. at the pressure of 0.3 mmHg, resulting in aminopolyester polyol (hereinafter, referred to as "m") with an hydroxyl value of 55.6, and an acid value of 0.5, and containing 4.13 mmol/g basic nitrogen.

Then, 168.5 parts of polydimethylsiloxanediol with general formula VII and with the number average molecular weight of 1800, 168.5 parts of MDI, and 0.10 part of dibutyltin dilaurate were put in a polymerization apparatus. To the mixture, 336.7 parts of tetrahydrofuran was added to dissolve the mixture, and a reaction was carried out for 20 minutes at 30° C. Next, after the mixture was cooled to 10° C., 45.04 parts of 1,4-butanediol dissolved in 165 parts of DMF was added dropwise over 5 minutes. The resultant mixture was allowed to react for 20 minutes at 10° C., 69.73 parts of the aminopolyester polyol (m) dissolved in 508 parts of DMF was added dropwise over 10 minutes, after which the mixture was allowed to react first 2 hours at 10°-20° C., then for 10 hours at 40° C., and last for 3 hours at 50° C. In this way, a solution of polyurethane M with a polymer concentration of 32% and viscosity of 1780 poise at 30° C. was obtained. To this solution, DMF was added with stirring, and a 5% solution was obtained.

Except for the use of DMF instead of the dioxane, the procedures of Example 1 were repeated to prepare a base polymer film M, polymer film M with quarternary ammonium groups, heparinized polymer film M with quarternary ammonium groups, and coated glass beads. The amount of basic nitrogen in the base polymer film M and the polymer film M with quarternary ammonium groups was 0.600 mmol/g and 0.125 mmol/g, respectively. Therefore, the extent of quarternarization was about 79%. The oxygen permeation coefficient of the base polymer M was $1.23 \times 10^{-8}$ and that of the polymer film M with quarternary ammonium groups was $1.48 \times 10^{-8}$. The relative coagulation time of the blood and complement activity with each of the polymers are shown in Table 4.

TABLE 4

| | Relative coagulation time | Complement activity | | |
|---|---|---|---|---|
| | | $CH_{50}$ (%) | 3a (ng/ml) | C5a (ng/ml) |
| Base polymer film M | 2.50 | 90.3 | 750 | 230 |
| Polymer film M with quarternary ammonium groups | 3.12 | 98.0 | 300 | 150 |
| Base polymer film M + heparin | 2.35 | 91.7 | 720 | 250 |
| Polymer film M with quarternary ammonium groups + heparin | >10 | 100 | 30 | 70 |
| Glass | 1.00 | 100 | 130 | 570 |

EXAMPLE 12

First, 1472 parts of 4-methyl-4-aza-2,6-heptanediol, 591 parts of 1,6-hexanediol, and 12.3 parts of phosphorous acid were put in an autoclave and heated for 16 hours at 200°-220° C. at atmospheric pressure with agitation under a stream of nitrogen, with removal of the water produced during the reaction. Then, at 220° C., pressure was decreased from 760 mmHg to 0.3 mmHg over two hours, and the reaction was allowed to continue for 3 more hours at 0.3 mmHg and at 220° C. In this way, aminopolyether polyol (hereinafter, referred to as "n") was obtained with a hydroxyl value of 57.3 and basic nitrogen content of 6.11 mmol/g.

Then, 1800 parts of polydimethylsiloxanediol of general formula VII and with a number average molecular weight of 1800, 300 parts of the aminopolyether polyol (n), 90.1 parts of 1,4-butanediol, 0.3 parts of dibutyltin dilaurate, and 554 parts of MDI were dissolved in a mixture of 1944 parts of tetrahydrofuran and 3887 parts of DMF. The mixture was stirred under a stream of nitrogen for 1 hour at 40° C. and then for 15 hours at 60° C. In this way, a solution of base polymer N with a polymer concentration of 32% and a viscosity of 3200 poise at 30° C. was obtained. To this polymer solution N, ethyl iodide was added as in Example 1 for the purpose of converting the tertiary amino groups to quaternary ammonium groups. Then, as in Example 1, a base polymer film N, polymer film N with quaternary ammonium groups, and heparinized polymer film N with quaternary ammonium groups were prepared. The groups and 5.53 mmol/g of tertiary amino groups was obtained.

Then, 2000 parts or polydimethylsiloxanediamine of general formula IX and with a number average molecular weight of 2000 and 400 parts of the aminopolyamide polyamine (o) were dissolved in a mixture of 1300 parts of THF and 4000 parts of DMF, and the mixture was put in a polymerization apparatus. To the mixture, 300 parts of MDI dissolved in 1000 parts of DMF was added dropwise over a 2-hour period at room temperature under a stream of nitrogen. In this way, a solution of base polymer O with a polymer concentration of 30% and the viscosity of 1200 poise was obtained. A polymer film O with quaternary ammonium groups, heparinized polymer film O with quaternary ammonium groups, and coated glass beads were prepared as in Example 1. The amount of basic nitrogen in the base polymer film O and the polymer film O with quaternary ammonium groups was 0.82 mmol/g and 0.30 mmol/g, respectively. Therefore, the extent of quarternization was 63.4%. Next, as in Example 1, the oxygen permeation coefficient, relative coagulation time, and complement activity were examined. The results are shown in Table 5.

TABLE 5

| | | Oxygen Permeability Coefficient* ($\times 10^{-8}$) | Relative coagulation Time (Glass = 1.00) | Activity of complement | | |
|---|---|---|---|---|---|---|
| | | | | $CH_{50}$ (%) | C3a | C5a |
| Examples | Base polymer film N | 3.35 | 3.00 | 94.0 | 350 | 200 |
| | Polmer film N with guarternary ammonium groups | 3.78 | 3.45 | 100 | 200 | 120 |
| | Polymer film N with guarternary ammonium groups + heparin | 3.65 | >10 | 100 | 20 | 40 |
| | Base polymer film O | 4.43 | 2.11 | 90.5 | 550 | 300 |
| | Polymer film O with guarternary ammonium groups | 4.66 | 2.45 | 90.1 | 300 | 270 |
| | Polymer film O with guarternary ammonium groups + heparin | 4.70 | >10 | 95.5 | 70 | 100 |
| Comparative Example | — | 1.23 | 1.43 | 80.3 | 800 | 750 |

*in $cm^3$(STP) $cm/cm^2 \cdot sec \cdot cmHg$ amount of basic nitrogen in the base polymer film N and the polymer film N with quaternary ammonium groups was 0.67 mmol/g and 0.30 mmol/g, respectively. Therefore, the extent of quarternization was about 55.2%.

Next, as in Example 1, the oxygen permeation coefficient, relative coagulation time, and complement activity were measured. The results are shown in Table 5. For comparison, the results from Comparative Example 1 are also shown in Table 5.

EXAMPLE 13

First, 2596 parts of 4-N, N-dimethylamino-propyl-4-aza-1,7-diaminoheptane and 1462 parts of adipic acid were dissolved in 4058 parts of water, and the mixture was put in an autoclave. The temperature of the mixture was raised to 230° C. during a three-hour period. During this time, the water that was produced was removed so as to keep the pressure in the autoclave at 10 atm. Then, at 230° C., the pressure was reduced to 1 atm during a 2-hour period, and a stream of nitrogen was introduced. Then, at 230° C., the pressure was gradually decreased from 760 mmHg to 0.3 mmHg, and a reaction was allowed to proceed at 0.3 mmHg for 2 hours at 230° C. In this way, aminopolyamide polyamine (hereinafter, referred to as "o") with 1.01 mmol/g of primary amino As is clear from Table 5, the polyurethane, polyurethaneurea, and their derivative polymers having quarternary ammonium groups, and heparinized polymers of this invention have qualities superior to those of the polymer of the comparative example, especially in terms of the oxygen permeation, anti-blood-clotting properties, and inhibition of complement activation.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A gas-permeable material compatible with blood that is produced by steps comprising:
   preparing polyurethane or polyurethaneurea from reactants comprising diisocyanate, polysiloxane containing terminal hydroxyl groups or polysiloxane containing terminal amino groups, and polyol of formula IIa or polyamine of formula Va:

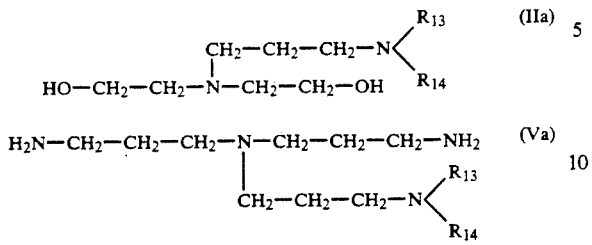

wherein $R_{13}$ and $R_{14}$ each independently is an alkyl group containing 1-10 carbon atoms;

converting tertiary amino groups contained in the polyurethane or the polyurethaneurea to quaternary ammonium groups; and treating the polyurethane or the polyurethaneurea having quaternary ammonium groups with heparin;

wherein the proportion by weight of the polysiloxane in the resulting polyurethane or polyurethaneurea is 30-85%, and the amount of tertiary amino groups in molecules included in the resulting polyurethane or polyurethaneurea is at a proportion of 0.05-2.00 mmol/g.

2. A gas-permeable material according to claim 1, wherein said $R_{13}$ and $R_{14}$ each independently is an alkyl group containing 1-5 carbon atoms.

3. A gas-permeable material according to claim 1, said reactants further comprising polyol or polyamine other than the polyol containing the tertiary amino group or polyamine containing the tertiary amino group.

4. A gas-permeable material compatible with blood produced by steps comprising:

preparing polyurethane or polyurethaneurea from reactants comprising diisocyanate, polysiloxane containing terminal hydroxyl groups or polysiloxane containing terminal amino groups, and polyesterpolyol containing an aminediol of formula IIb with dicarboxylic acid as a main component thereof, polyetherpolyol obtained by the condensation of aminediol of formula IIc or polyamide polyamine containing aminodiamine of formula Vb with dicarboxylic acid as a main component thereof:

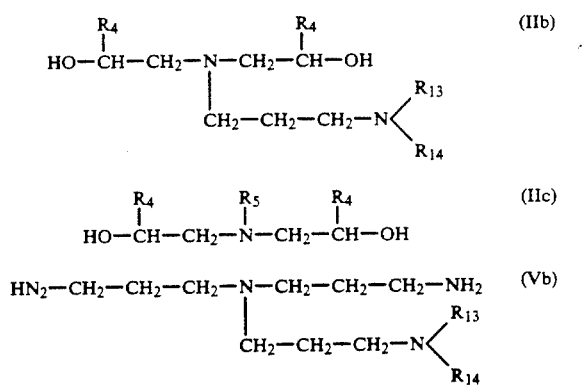

wherein $R_4$ is a hydrogen atom or an alkyl group containing 1-5 carbon atoms, $R_5$ is an alkyl group containing 1-20 carbon atoms, and $R_{13}$ and $R_{14}$ each independently is an alkyl group containing 1-10 carbon atoms;

converting tertiary amino groups contained in the polyurethane or the polyurethaneurea to quaternary ammonium groups; and treating the polyurethane or the polyurethaneurea having quaternary ammonium groups with heparin;

wherein the proportion by weight of the polysiloxane in the resulting polyurethane or polyurethaneurea is 30-85%, the amount of tertiary amino groups in molecules included in the resulting polyurethane or polyurethaneurea is at a proportion of 0.05-2.00 mmol/g, and the molecular weights of the polyesterpolyol, polyetherpolyol and polyamide polyamine are 500-8000.

5. A gas-permeable material according to claim 4, wherein said $R_4$ is a methyl group.

6. A gas-permeable material according to claim 4, wherein said $R_{13}$ and $R_{14}$ each independently is an alkyl group containing 1-5 carbon atoms.

7. A gas-permeable material according to claim 4, wherein said molecular weights of the polyesterpolyol, polyetherpolyol and polyamide polyamine are 500-4000.

8. A gas-permeable material according to claim 4, said reactants further comprising polyol or polyamine other than the polyol containing the tertiary amino group or polyamine containing the tertiary amino group.

* * * * *